ced apart. At 2, 3, are races or members
UNITED STATES PATENT OFFICE.

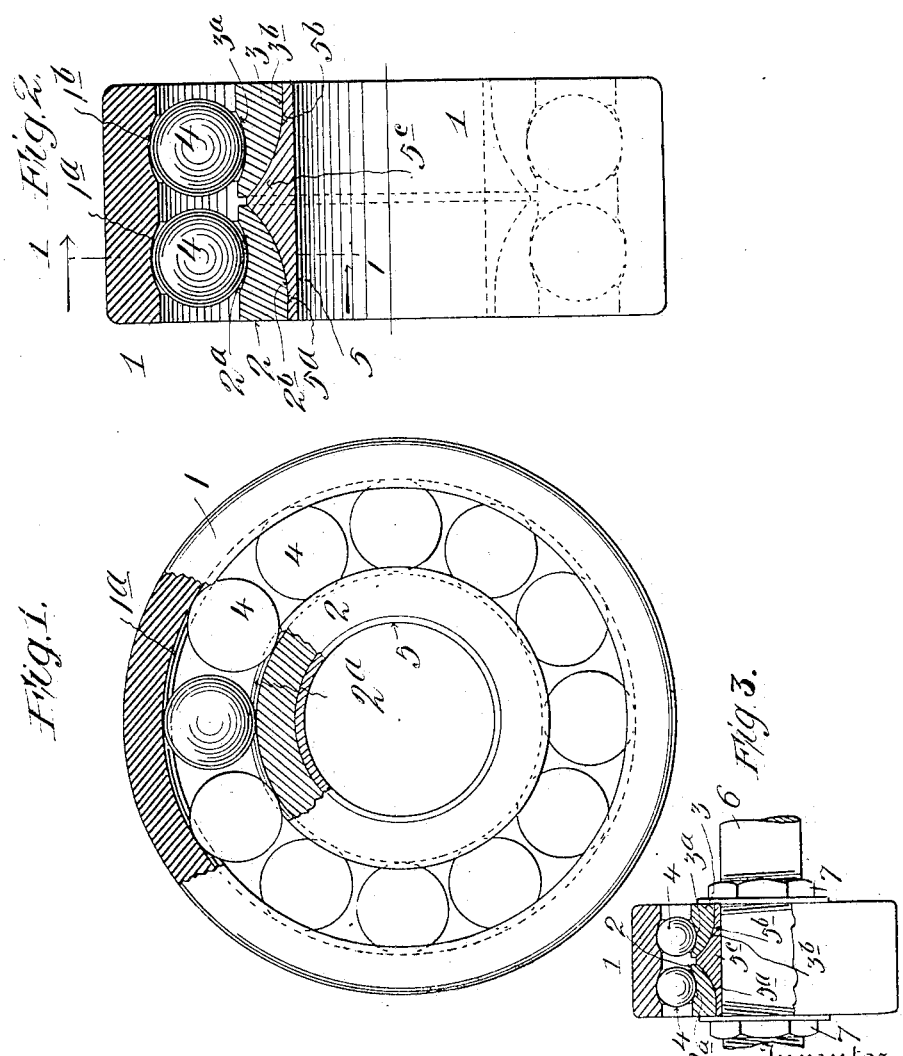

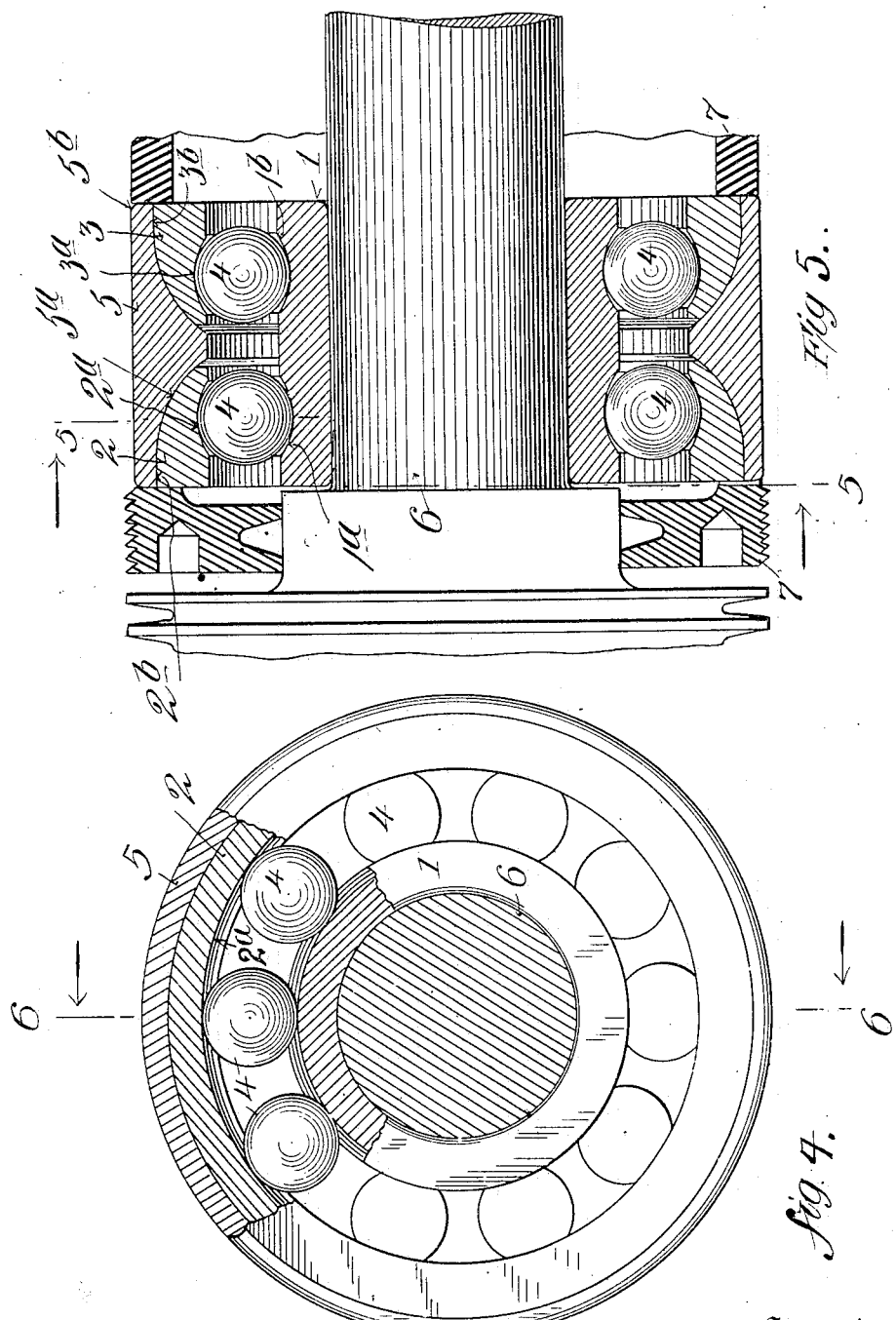

CHARLES F. SULTEMEYER, OF NEW YORK, N. Y., ASSIGNOR, BY MESNE ASSIGNMENTS, TO GLOBE BALL BEARING CO., OF BROOKLYN, NEW YORK, A CORPORATION OF NEW YORK.

ANTIFRICTION-BEARING.

1,121,208.  Specification of Letters Patent.  Patented Dec. 15, 1914.

Application filed January 20, 1911. Serial No. 603,650.

*To all whom it may concern:*

Be it known that I, CHARLES F. SULTE-MEYER, a citizen of the United States, and resident of New York city, borough of the Bronx, in the county of New York and State of New York, have invented certain new and useful Improvements in Antifriction-Bearings, of which the following is a specification.

My invention relates to improvements in the class of anti-friction bearings commonly called "radial," and particularly to such bearings having a plurality of rows of parallel rolling members, such as balls.

The object of my invention is to distribute the load upon the different rows or series of rolling members and to equalize the load within safe limits of elasticity of the metal of the parts, whereby if the load tends to shift to one series of rolling members it will be automatically more or less distributed to the other series of rolling members, so as to equalize or maintain a balance of the load between the several series of rolling members.

In carrying out my invention I provide a race having a plurality of parallel working surfaces or grooves and a plurality of concentric races having working surfaces or grooves alined with the corresponding grooves of the first named race, and rolling members interposed between the corresponding opposed wearing surfaces or grooves, whereby the races are shiftable laterally relatively to one another and the load may be equalized and distributed between the races as occasion requires.

My invention further comprises novel details of improvement and combinations of parts that will be more fully hereinafter set forth and then pointed out in the claims.

Reference is to be had to the accompanying drawings forming part hereof, wherein, Figure 1 is a face view of a bearing embodying my improvements, partly in section on the line 1, 1, in Fig. 2; Fig. 2 is a partly sectional edge view of Fig. 1; Fig. 3 is a detail sectional view illustrating means for maintaining the inner races of Figs. 1 and 2 in relative positions; Fig. 4 is a section on the line 5, 5, in Fig. 5, illustrating a different relation of the parts from that shown in Figs. 1 to 3, and Fig. 5 is a section on the line 6, 6, in Fig. 4.

Similar numerals of reference indicate corresponding parts in the several views.

The numeral 1 indicates a race or member shown provided with a plurality of parallel raceways or grooves 1ª, 1ᵇ, suitably spaced apart. At 2, 3, are races or members concentric with race or member 1 and provided with parallel raceways or grooves 2ª, 3ª, alined with the raceways 1ª, 1ᵇ. Between the outer and inner races or members and within the corresponding raceways are rolling members, such as balls 4. In Figs. 1, 2 and 3 I have shown the races 2, 3, within race 1 and surrounding a ring-like part 5 adapted to receive and fit upon a shaft or supporting part 6, while in Figs. 4 and 5 the ring-like part 5 surrounds the races 2, 3, said parts surrounding race 1 which receives shaft or support 6. Ring 5 is provided with parallel seats for the races 2, 3. In the arrangement shown the parallel seats 5ª, 5ᵇ of ring 5 are curved to match the correspondingly curved faces 2ᵇ, 3ᵇ of races 2, 3. Seats 5ª, 5ᵇ are shown so shaped as to provide an intermediate or centrally disposed raised or protruding portion 5ᶜ, and the faces 2ᵇ, 3ᵇ of the races 2, 3, are correspondingly but reversely shaped. In other words, it may be said that the seats 5ª, 5ᵇ curve in a direction from the edges of ring 5 so that the latter is gradually increasing in thickness toward its transverse center line, while the surfaces 2ᵇ, 3ᵇ of races 2, 3, correspondingly curve and have their thinner portions at their adjacent edges and their thicker portions at their outer edges. The arrangement is such that when the load becomes greater on one series of balls than upon another an equalization will take place owing to the elasticity of the material of the races and the ring 5, and within safe limits of such elasticity, providing for a large thrust of the load, and by reason of the curved opposing faces of seats 5ª, 5ᵇ and surfaces 2ᵇ, 3ᵇ slight relative movement of said parts may take place to ease the action.

The races 2, 3, may be held from lateral movement by any suitable means, such as by the collars 7 screwed or otherwise held upon shaft 6 or a surrounding part and fitted snugly against the outer faces of races 2, 3, and the ring 5. By this means the races and ring will be maintained in relative positions, and the concentric race or member 1, which will be fitted to a hub, shaft or other part, may have limited lateral movement to ease the work. The balls may be inserted between the races by forcing them into place under pressure, by means of wellknown notches in the races, or in other suitable manner.

Having now described my invention what I claim is:—

1. A double complement radial ball bearing comprising inner and outer concentric members, each provided with a pair of annular raceways, and having a double complement of balls confined radially and axially between opposed raceways of the two pairs; each raceway of one member being formed complete with both embracing walls in a separate integral annular raceway piece; said raceway pieces being supported by said member, through peripheral faces on the member and raceway pieces that are curved radially and axially toward the middle radial plane of the bearing; said member having a dividing ridge between its said curved supporting surfaces and between the curved circumferential faces of the raceway pieces and providing a separating ridge between said pieces.

2. A double complement radial ball bearing comprising inner and outer concentric members, each provided with a pair of annular raceways, and having a double complement of balls confined radially and axially between opposed raceways of the two pairs, all of said raceways being formed with their two confining walls integral; the raceways of one member being both formed integral with said member, and each raceway of the other member being formed complete with both embracing walls in a separate integral annular raceway piece; said raceway pieces being supported by said other member, through peripheral faces on the member and raceway pieces that are curved radially and axially toward the middle radial plane of the bearing; said member having a dividing ridge between its said curved supporting surfaces and between the curved circumferential faces of the raceway pieces and providing a separating ridge between said pieces.

Signed at New York city, in the county of New York, and State of New York, this 19th day of January, A. D. 1911.

CHARLES F. SULTEMEYER.

Witnesses:
RALPH H. RAPHAEL,
T. F. BOURNE.